United States Patent
Tidhar (10) Patent No.: US 11,139,569 B2
(45) Date of Patent: Oct. 5, 2021

(54) ANTENNA SYSTEM, METHOD AND COMPUTER PROGRAM PRODUCT, WITH REAL TIME AXIAL RATIO POLARIZATION CORRECTION

(71) Applicant: Elta Systems Ltd., Ashdod (IL)

(72) Inventor: Nir Tidhar, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 301 days.

(21) Appl. No.: 16/437,148

(22) Filed: Jun. 11, 2019

(65) Prior Publication Data
US 2019/0379117 A1 Dec. 12, 2019

(30) Foreign Application Priority Data
Jun. 12, 2018 (IL) .......................................... 259973

(51) Int. Cl.
*H01Q 3/26* (2006.01)
*H01Q 15/24* (2006.01)
(Continued)

(52) U.S. Cl.
CPC ........... *H01Q 3/267* (2013.01); *H01Q 9/0428* (2013.01); *H01Q 15/246* (2013.01); *H04B 17/24* (2015.01)

(58) Field of Classification Search
None
See application file for complete search history.

(56) References Cited

U.S. PATENT DOCUMENTS 6,211,823 B1 * 4/2001 Herring ................ H01Q 1/3233
343/700 MS
8,089,403 B2 * 1/2012 Wakabayashi ........... H01Q 3/04
342/357.76
(Continued)

FOREIGN PATENT DOCUMENTS

WO 2007011974 A1 1/2007
WO 2017185106 A1 10/2017

OTHER PUBLICATIONS

Antenna-Theory.Com, "Polarization—EM Waves and Antennas", https://web.archive.org/web/20180518105702/antenna-theory.com/basics/polarization.php, May 2018, 7 pages.
(Continued)

*Primary Examiner* — Nhan T Le
(74) *Attorney, Agent, or Firm* — Dorsey & Whitney LLP (57) ABSTRACT

Antenna system comprising processor/s in data communication with receiving segment/s in motion on ground and computer memory accessible to processor which stores a computer representation indicative of desirable polarization behavior parameter/s of the airborne transmitting segment, for each relative location of the airborne and ground segments, the processor providing a current relative location of the airborne transmitting and receiving segment/s on the ground, accessing a desirable polarization behavior parameter associated with the current relative location of the airborne and receiving segment/s on ground from the computer representation, accessing a current polarization behavior parameter of the receiving segment/s' antenna, computing a real time adjustment of the polarization's axial ratio which, if applied to the receiving segment antenna, will change the receiving segment antenna's polarization behavior parameter from the current polarization behavior param-
(Continued)

eter to the stored one, and feeding the real time adjustment to the receiving segment antenna.

14 Claims, 4 Drawing Sheets

(51) Int. Cl.
*H01Q 9/04* (2006.01)
*H04B 17/24* (2015.01)

(56) References Cited

U.S. PATENT DOCUMENTS

| | | | |
|---|---|---|---|
| 8,145,208 B2* | 3/2012 | Chari | H01Q 1/283 455/431 |
| 8,880,059 B2 | 11/2014 | Leabman | |
| 9,520,637 B2* | 12/2016 | Monte | H01Q 1/125 |
| 9,806,794 B2 | 10/2017 | Jalali | |
| 9,923,712 B2* | 3/2018 | Shirinfar | H01Q 3/26 |
| 2015/0022399 A1 | 1/2015 | Clymer et al. | |
| 2017/0311174 A1 | 10/2017 | Tidhar | |

OTHER PUBLICATIONS

Eutelsat Communications, "Calculation of Azimuth, Elevation and Polarization for non-horizontal aligned Antennas", https://web.archive.org/web/20171008105417/eutelsat.com/files/contributed/support/pdf/azimuth-elevation-polarization.pdf, Jul. 8, 2015, 49 pages.
Grewal, Mohinder S. et al., "Global positioning systems, inertial navigation, and integration", John Wiley & Sons (2nd Edition) http://read.pudn.com/downloads165/ebook/756636/Global_Positioning_Systems_Inertial_Navigation_and_Integration.pdf, 2007, 554 pages.
RF Cafe Website, "Electronic Warfare and Radar Systems Engineering Handbook—Polarization", https://web.archive.org/web/20180503223648/http://rfcafe.com/references/electrical/ew-radar-handbook/polarization.htm, May 2018, 3 pages.
Strang, Gilbert et al., "Linear algebra, geodesy, and GPS", Chapter 14: Global Positioning System, 1997, 642 pages.

* cited by examiner

A. providing at least one processor in respective data communication with at least one receiving segment in motion on the ground including an antenna

↓

B. providing computer memory in data communication with the processor and which stores a computer representation indicative of at least one desirable polarization behavior parameter of the airborne transmitting segment, typically for each of multiple relative locations of the airborne and ground segments

↓ c. using the processor to provide a current relative location of the airborne transmitting segment and receiving segment/s on the ground

↓ d. using the processor to access an desirable polarization behavior parameter associated with the current relative location of the airborne segment and receiving segment/s on the ground from said computer representation

↓ e. using the processor to access a current polarization behavior parameter of at least one of said receiving segment/s' antenna

↓ f. using the processor to compute a real time adjustment of the polarization's axial ratio which, if applied to the receiving segment antenna, will change the receiving segment antenna's polarization behavior parameter from said current polarization behavior parameter to said stored polarization behavior parameter, and

↓ g. using the processor to feed said real time adjustment to said receiving segment antenna

FIG. 3 operation 0. off-line, a polarization behavior table for a circular antenna 60 (transmitting segment) may be saved, typically in the receiving segment memory 130.

↓

Operation 1: The receiving segment (120) receives information regarding transmitting segment 60:Location (e.g. LAT and/or LON and/or ALT) and/or body angles (e.g. YAW and/or PITCH and/or ROLL).

↓

Operation 2: processor 90 typically computes the pointing p1 (Elevation, Azimuth bearing) from the aircraft to the gnd segment and/or pointing p2 (Elevation, Azimuth bearing) from the gnd to the airborne segment.

↓

Operation 3: processor 90 computes the pointing p3 (Elevation, Azimuth bearing) from the ground to the airborne segment, e.g. using Euler angles or quaternions.

↓

Operation 4: processor 90 computes the pointing p4 (Elevation, Azimuth bearing) from the airborne segment to the ground, typically relative to the body angles of the transmitting segment.

↓

Operation 5: Retrieve polarization behavior or polarization angle or axial ratio data (e.g. axial ratio angle or axial ratio itself), stored for the (Elevation aka el, Azimuth aka az) angle pair of P4

↓

Operation 6: to determine the polarization which optimizes reception by the phased array antenna aka receiving segment, phased array antenna may be offset by the angle retrieved from memory 130, in operation 5. offsetting command may be sent to the receiving segment antenna accordingly and/or final polarization may be fed as an input to the antenna

Fig. 4

ANTENNA SYSTEM, METHOD AND COMPUTER PROGRAM PRODUCT, WITH REAL TIME AXIAL RATIO POLARIZATION CORRECTION

FIELD OF THIS DISCLOSURE

The present invention relates generally to antennae and more particularly to real time control of antennae.

BACKGROUND FOR THIS DISCLOSURE

Polarization is an important physical feature in antenna theory, e.g. as described online in antenna theory handbooks such as antenna-theory.com/basics/polarization.php and rfcafe.com/references/electrical/ew-radar-handbook/polarization.htm.

As described, each antenna is characterized by its polarization e.g. the polarization of the radiated fields produced by the antenna when evaluated in the far field. An antenna may be "linearly" (whether horizontally or vertically or slanted) or "circularly" polarized, either right hand or left hand. Polarization affects antenna to antenna communication. For example, a horizontally polarized antenna cannot communicate with a vertically polarized antenna because the vertically polarized antenna, unlike its counterpart (horizontally polarized) antenna, transmits and receives vertically polarized fields, hence there can be no reception. If a linearly polarized antenna tries to receive a circularly polarized wave or a circularly polarized antenna tries to receive a linearly polarized wave, the resulting linear-to-circular Polarization Loss Factor (aka polarization efficiency, antenna mismatch factor, or antenna receiving factor) is 0.5, or −3 decibels, irrespective of the angle that linearly polarized (LP) antenna is rotated to.

As described, the sum of the electric field vectors over time is generally an ellipse. Under certain conditions, the ellipse collapses into a straight line, yielding linear polarization, whereas in other cases, e.g. when the two components are of equal magnitude and 90° out of phase, the ellipse collapses to a circle yielding circular polarization. It is appreciated that the theoretical ratio of power transmitted between antennas of different polarization is seldom fully achieved due to reflection, refraction and other wave interactions. A typical radar warning receiver antenna has a maximum 3 dB axial ratio within 45° of boresight. However, for any antenna with an aperture area, the viewed dimension along the axis remains constant as the aperture is rotated, whereas the other, perpendicular dimension decreases to zero at 90° rotation, hence the antenna's axial ratio deteriorates as the antenna is rotated off boresight.

Methods for algorithmically computing azimuth, elevation and polarization for non-horizontal aligned antennas are described in Technical Document TD-1205-a, available online at eutelsat.com/files/contributed/support/pdf/azimuth-elevation-polarization.pdf whose disclosure is hereby incorporated by reference.

Transformations between coordinate systems described in *Global Positioning Systems, Inertial Navigation, And Integration*, 2nd Edition, By Mohinder S. Grewal Et Al, John Wiley & Sons, Inc., 2007, are available online at read.pudn.com/downloads165/ebook/756636/Global_Positioning_Systems_Inertial_Navigation_and_Integration.pdf.

Published co-pending US patent application US20170311174A1 the disclosure of which is hereby incorporated by reference, describes in paragraph 79 that "[0079] Techniques for determining the antenna radiation pattern may be based on numerical techniques of modeling the antenna and the aircraft. For example, software like WIPL-D, SAVANT, PATCH and APATCH may be used to create such models. Other techniques can also be used, such as flight tests involving mounting the aircraft on a tiltable pedestal and illuminating the aircraft with a radio frequency field over a wide range of orientations of the aircraft. Other techniques may also use a radiation chamber.

Published patent document WO2007011974 (a1) describes a point-to-multipoint communications system and method.

Published patent document U.S. Pat. No. 8,145,208 (b2) describes an air-to-ground cellular communication network terrestrial base station having multi-dimensional sectors with alternating radio frequency polarizations Published patent document U.S. Pat. No. 9,806,794 (B2) describes an antenna system for a broadband access to airborne platforms.

Published patent document WO2017185106 (A1) describes a system for communications with unmanned aerial vehicles using two frequency bands.

Published patent document U.S. Pat. No. 8,880,059 (B2) describes a system and methods for media access control optimization for long range wireless communication.

Patent document US2015022399 describes a communication system with broadband antenna.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Axial ratio typically refers to a parameter which characterizes an antenna's polarization e.g. the polarization of the electromagnetic wave that the antenna radiates in the far field. The electromagnetic wave radiated by the antenna is a mixture of electric and magnetic fields. If the curve traced by the tip of the electric field vector is tracked over time, in a given location L in space which may change dynamically over time, this tracking may yield, over time, a curve known as the polarization ellipse, which is specific to the location L, since antenna polarization is a function of a phased array antenna's direction of observation where typically, a phased array antenna is doing the observing A polarization ellipse may be defined by two parameters: axial ratio AR and tilt angle. The axial ratio may be defined as the ratio of the lengths of the polarization ellipse's major and minor axes, e.g. may always be at least 1. If the polarization is circular, the axial ratio equals 1 (0 dB) and the tilt angle is undefined. For linear polarization, the axial ratio is infinite.

Certain embodiments seek to provide a system operative for real time adjustment or correction of the polarization's axial ratio or axial ratio polarization, e.g. between an airborne platform and moving ground units, to optimize reception by (say) receiving segments as they move on the ground, or by airborne receiving segments to which moving ground units are transmitting.

Certain embodiments seek to provide a system and method for handling polarization distortion problems.

Certain embodiments of the present invention seek to provide circuitry typically comprising at least one processor in communication with at least one memory, with instructions stored in such memory executed by the processor to provide functionalities which are described herein in detail.

Any functionality described herein may be firmware-implemented or processor-implemented, as appropriate.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several of such), which may be deployed off-shore or "on a cloud", and an output of the operation is then communicated, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention typically includes at least the following embodiments:

Embodiment 1

An antenna system operative in conjunction with an airborne transmitting segment and moving ground receiving segments having polarization therebetween, the polarization having an axial ratio, the system comprising:

at least one processor in respective data communication with at least one receiving segment in motion on the ground including an antenna; and computer memory which is accessible to the processor and which stores a computer representation indicative of at least one desirable polarization behavior parameter of the airborne transmitting segment, for each of multiple relative locations of the airborne and ground segments, the processor being configured to provide a current relative location of the airborne transmitting segment and receiving segment/s on the ground, to access an desirable polarization behavior parameter associated with the current relative location of the airborne segment and receiving segment/s on the ground from the computer representation, to access a current polarization behavior parameter of at least one of the receiving segment/s' antenna, to compute a real time adjustment of the polarization's axial ratio which, if applied to the receiving segment antenna, will change the receiving segment antenna's polarization behavior parameter from the current polarization behavior parameter to the stored polarization behavior parameter, and to feed the real time adjustment to the receiving segment antenna.

A desirable polarization behavior parameter of the airborne transmitting segment is typically associated in memory, with each of multiple relative locations of the airborne and ground segments. For example, a table may be stored in memory, and each record in the table may include at least one individual relative location of airborne and ground segments and a desirable polarization behavior parameter for that individual relative location.

It is appreciated that the airborne component need not necessarily be an aircraft and may alternatively be any airborne object.

Embodiment 2

A system according to any of the preceding embodiments wherein the airborne transmitting segment comprises a circularly polarized antenna.

It is appreciated that the converse is also possible e.g. that at least one of or all of the moving ground receiving segments would comprise a circularly polarized antenna. Alternatively or in addition, the described real time adjustment could be to an airborne antenna rather than ground antennae.

Embodiment 3

A system according to any of the preceding embodiments wherein at least one of the moving ground receiving segments comprises a phased array antenna.

Embodiment 4

A system according to any of the preceding embodiments wherein the desirable polarization behavior parameter comprise a polarization angle A which improves reception, relative to at least one polarization angle other than the polarization angle A, between the airborne transmitting segment and moving ground receiving segment, given the current relative location of the airborne segment and segment on the ground.

Embodiment 5

A system according to any of the preceding embodiments wherein the relative locations of the airborne and ground segments are represented in memory by azimuth and elevation angles defining a direction from which the receiving segment is currently viewing the transmitting segment.

Embodiment 6

A system according to any of the preceding embodiments wherein the airborne transmitting segment comprises a phased array antenna.

Embodiment 7

A system according to any of the preceding embodiments wherein at least one of the moving ground receiving segments comprises a circularly polarized antenna.

Embodiment 8

A system according to any of the preceding embodiments wherein the at least one processor in respective data communication with at least one receiving segment in motion comprises plural processors in respective data communication with plural receiving segments in motion, respectively.

Embodiment 9

A system according to any of the preceding embodiments wherein the processor is co-located with (on board) the receiving segment in motion.

Embodiment 10

A system according to any of the preceding embodiments wherein the desirable polarization behavior parameter comprises a polarization angle A which improves reception, relative to most polarization angles other than the polarization angle A, between the airborne transmitting segment and moving ground receiving segment, given the current relative location of the airborne segment and segment on the ground.

Embodiment 11

A system according to any of the preceding embodiments wherein the desirable polarization behavior parameter comprises a polarization angle A which improves reception, relative to all polarization angles other than the polarization angle A, between the airborne transmitting segment and moving ground receiving segment, given the current relative location of the airborne segment and segment on the ground.

Embodiment 12

A system according to any of the preceding embodiments wherein the computer representation indicative of at least one desirable polarization behavior parameter comprises at least one of:
  the parameter itself;
  data from which the at least one desirable polarization behavior parameter is derivable; and
  data from which the at least one desirable polarization behavior parameter can be estimated.

Embodiment 13

A method for controlling an antenna system operative in conjunction with an airborne transmitting segment and moving ground receiving segments having polarization therebetween, the polarization having an axial ratio, the method comprising:
  providing at least one processor in respective data communication with at least one receiving segment in motion on the ground including an antenna; and
  providing computer memory which is accessible to the processor and which stores a computer representation indicative of at least one desirable polarization behavior parameter of the airborne transmitting segment, for each of multiple relative locations of the airborne and ground segments,
  the processor being operative:
    to provide a current relative location of the airborne transmitting segment and receiving segment/s on the ground,
    to access an desirable polarization behavior parameter associated with the current relative location of the airborne segment and receiving segment/s on the ground from the computer representation,
    to access a current polarization behavior parameter of at least one of the receiving segment/s' antenna,
    to compute a real time adjustment of the polarization's axial ratio which, if applied to the receiving segment antenna, will change the receiving segment antenna's polarization behavior parameter from the current polarization behavior parameter to the stored polarization behavior parameter, and
    to feed the real time adjustment to the receiving segment antenna.

Embodiment 14

A computer program product, comprising a non-transitory tangible computer readable medium having computer readable program code embodied therein, the computer readable program code adapted to be executed to implement a method for controlling an antenna system operative in conjunction with an airborne transmitting segment and moving ground receiving segments having polarization therebetween, the polarization having an axial ratio, the method comprising:
  providing at least one processor in respective data communication with at least one receiving segment in motion on the ground including an antenna; and
  providing computer memory which is accessible to the processor and which stores a computer representation indicative of at least one desirable polarization behavior parameter of the airborne transmitting segment, for each of multiple relative locations of the airborne and ground segments,
  the processor being operative:
    to provide a current relative location of the airborne transmitting segment and receiving segment/s on the ground,
    to access an desirable polarization behavior parameter associated with the current relative location of the airborne segment and receiving segment/s on the ground from the computer representation,
    to access a current polarization behavior parameter of at least one of the receiving segment/s' antenna,
    to compute a real time adjustment of the polarization's axial ratio which, if applied to the receiving segment antenna, will change the receiving segment antenna's polarization behavior parameter from the current polarization behavior parameter to the stored polarization behavior parameter, and
    to feed the real time adjustment to the receiving segment antenna.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, whereever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality, or operations stipulated as being software-implemented, may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include an apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

A method for correcting polarization e.g. by real time correction of axial ratio polarization is now described, in stages a-i. The method is useful e.g. for real-time adjustment of linear polarization of ground antennae to a dominant component of elliptical polarization of an airborne antenna thereby to optimize or improve communication, e.g. continuously or at intervals or periodically, between the ground and airborne segments.

a: Offline, the polarization behavior e.g. circular polarization angle of the transmitting segment, is measured or simulated, for all possible pointing values from receiving segment to transmitting segment. Typically, polarization behavior includes the polarization angle, typically for each possible airborne antenna azimuth angle and each possible airborne antenna elevation angle. The antenna gain measured or simulated for each possible airborne antenna azimuth angle and each possible airborne antenna elevation angle, may also be stored.

According to some embodiments, the polarization behavior of a transmitting antenna comprises the polarization of the transmitting antenna's radiated wave in the far zone.

According to some embodiments, the polarization behavior of a receiving antenna comprises the polarization of an incident plane wave, which, for a given power flux density, results in maximum available power at the receiving antenna terminals.

Figure 1:
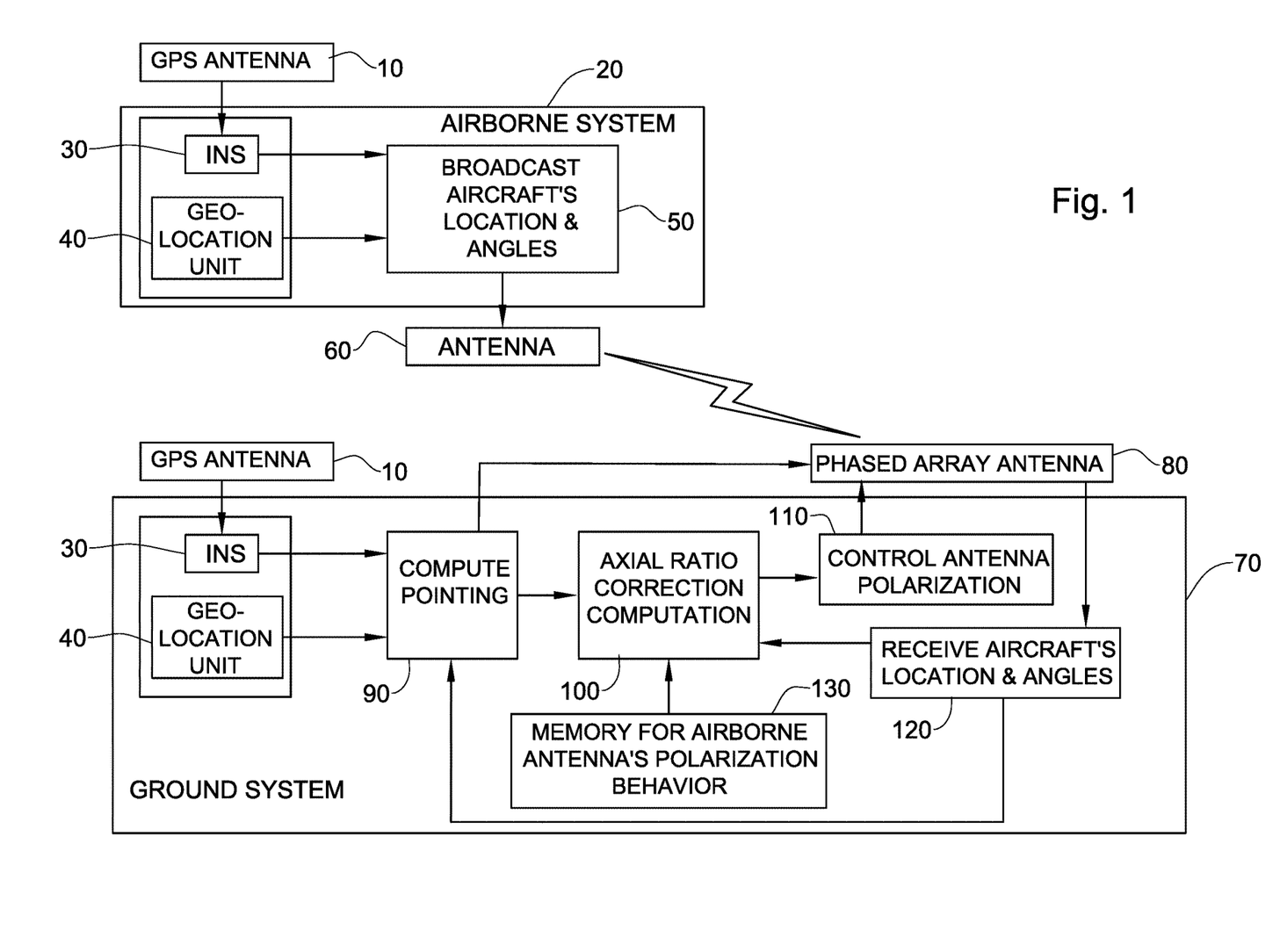
FIG. 1 is a simplified block diagram illustration of a real-time antenna polarization correction system constructed and operative in accordance with an embodiment of the present invention.
Figure 2:
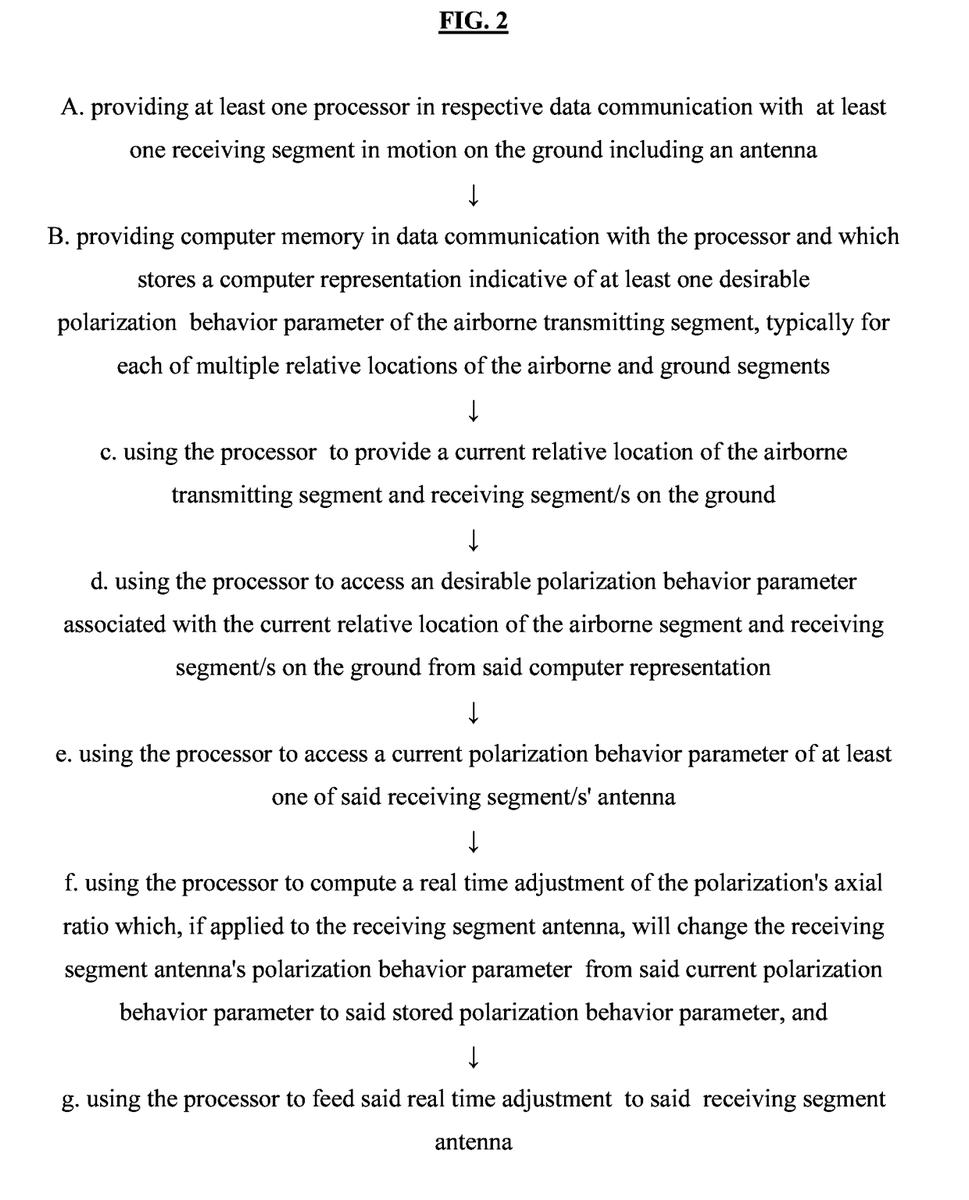
FIG. 2 is a simplified flow diagram of a method for controlling an antenna system, e.g. in real time, the method typically being operative in conjunction with an airborne transmitting segment and moving ground receiving segments having polarization therebetween, the polarization having an axial ratio, the method comprising any subset of or all of the illustrated operations, suitably ordered e.g. as shown, and which may be used e.g. in conjunction with the system of FIG. 1 (or FIG. 4, mutatis mutanding).

According to some embodiments, the polarization behavior comprises a Polarization angle e.g. an angle in which the power received by a transmitting segment aka test antenna, is at a peak. Typically, the antenna or transmitting segment to be tested, is used as the source and the receive antenna is a linearly polarized (typically half-wave dipole) antenna. To identify the polarization angle, typically, the conventional antenna polarization measurement setup of prior art FIG. 1 is employed. The power received by the linearly polarized receive antenna is measured, as the linearly polarized receive antenna is rotated about the x-axis (axis perpendicular to the z axis defined by the linearly polarized receive antenna). The received power is recorded for each angle of the receive antenna.

This information determines polarization of the test antenna for the direction in which the power is received. To determine the polarization of the test antenna for other directions of interest, the test antenna is rotated and the polarization determined for each direction of interest.

The power is recorded for the fixed position (orientation) of the receive antenna, then the receive antenna is rotated about the x-axis as shown in prior art FIG. 1, and the power is recorded for each azimuthal position (e.g. for each degree from among the 360 degrees corresponding to complete rotation) of the linearly polarized receive antenna about the x-axis. According to some embodiments, the test and receive antennae are both vertically linearly polarized, and the antennae's polarization match at rotation angle zero. According to other embodiments, the test antenna is, say, horizontally linearly polarized, but is not polarization matched to the receive antenna at rotation angle=0.

b: in stage b, the polarization behavior measured or simulated in stage a, is pre-stored e.g. as a table e.g. in the receiving segment's memory (typically on the ground), for example, a polarization angle may be stored for each (airborne antenna azimuth angle, airborne antenna elevation angle) pair, where the first angle in the pair is 0, 2, 4, . . . , 178, 180 degrees and the second angle in the pair is 90, 88, 86, . . . 0, −2, −4, . . . −88, −90 degrees. Any suitable resolution between adjacent azimuth and elevation angles may be used, e.g. a resolution anywhere between, say 1-3 degrees, nor does the resolution need to be the same for the azimuth angles as for the elevation angles.

c. in stage c, the receiving segment's processor (which may be physically adjacent e.g. on-board the receiving segment) receives the location (LAT, LON, ALT) of the transmitting segment e.g. from the airborne (or ground system) GPS system.

d. in step d, the receiving segment's processor receives the body angles of the transmitting segment e.g. from the airborne (or ground system) inertial navigation system (INS). Typically, an airborne inertial navigation system (INS) e.g. on an aircraft, includes all or any subset of: computer, motion sensors e.g. accelerometers, rotation sensors e.g. gyroscopes), magnetic sensors e.g. magnetometers), for continuous computation e.g. by dead reckoning of the aircraft's current position, orientation and velocity, without the need for any external references.

e. The receiving segment's processor determines the relative locations, typically including both elevation and azimuth, of the transmitting and receiving segments or of the airborne and ground systems. Typically, the processor computes the pointing (elevation, azimuth bearing) to the transmitting segment as a function of the location (LAT, LON, ALT) and body angles (INS) of the transmitting segment received in stage c (or in stages c, d respectively), relative to the body angles of the receiving segment e.g. as described in chapter 14, entitled "Chapter 14: Global Positioning System," in Linear Algebra, Geodesy, and GPS, by Gilbert Strang, which provides algorithms, e.g. expressed in MATLAB, for geodesy and global positioning.

f. Coordinate transformation may be applied e.g. using conventional coordinate transformations which may be quaternion-based or Euler angle-based, e.g. if the relative locations generated in stage e are defined in one coordinate system, whereas the data in the receiving segment memory is in a different coordinate system.

More generally, any suitable transformation formulae or processes may be used herein, to convert or transform (using rotation and/or translation and/or change of scale), say, topocentric to geocentric coordinates (e.g. to facilitate comparison with GPS derived coordinates) or vice versa i.e. geocentric to topocentric, typically using a transformation which is inverse to the transformation used to convert the topocentric to geocentric coordinates.

g. The polarization behavior parameter/s of the transmitting segment at the pointing as computed, is/are retrieved, by the receiving segment's processor, from the receiving segment memory pre-loaded in stage a.

h. in stage h, the receiving segment's processor computes the relative polarization correction from the polarization behavior parameters retrieved in stage g. Any suitable technology e.g. quaternion based or Euler angle based, may be employed. Typically, the relationship or ratio is found, between the airborne antenna's polarization and the ground antenna's polarization e.g. as described herein with reference to stage f.

i. in stage i, the relative polarization correction, computed in stage h, is fed as an input e.g. to the antenna (typically both the transmitting and receiving segments). For example, conventional phased array antenna systems have elements which, in real time, adjust the vertical and horizontal phase at which a receiving segment will receive and a transmitting antenna will transmit, responsive to a digital command received from a computational unit associated with the phased array antenna system.

It is appreciated that any of the above stages may be omitted, or stages may be differently ordered.

It is appreciated that coordinate transformations as mentioned herein in various contexts may be effected using any suitable technology such as but not limited to quaternion-based or Euler angle-based technology. For example, the Grewal et al reference mentioned herein teaches that various coordinate systems are used in navigation. Typically, navigation processes use coordinate systems that suit the use-case e.g. inertial coordinates for inertial navigation, orbital coordinates for GPS navigation, earth-fixed coordinates for representing locations on the earth, and so forth. Transformations between these different coordinate systems are known, e.g. as per appendix C in Global Positioning Systems, Inertial Navigation, And Integration, 2nd Edition, by Mohinder S. Grewal Et Al, John Wiley & Sons, Inc., 2007. From-to notation is used by Global Positioning Systems, Inertial Navigation, And Integration, 2nd Edition, by Mohinder S. Grewal Et Al, John Wiley & Sons, Inc., 2007 to denote a coordinate transformation matrix (or "direction cosines Matrix) from one coordinate frame (designated by "from") to another coordinated frame (designated by "to"). For example, a coordinate transformation matrix may transfer from earth-centered inertial (ECI) coordinates to earth-fixed east-north-up (ENU) local coordinates or from vehicle body-fixed roll-pitch-yaw (RPY) coordinates to earth-fixed north-east-down (NED) coordinates or from NED to RPY or from RPY to ENU coordinates, etc.

The Grewal et al reference teaches that transformations between Cartesian (orthogonal) coordinates, may be represented by orthogonal matrices. Coordinate transformations may also be represented by rotation vectors or quaternions.

Generally, coordinate transformations may include any suitable method for transforming a vector represented in one coordinate system into a representation in another coordinate system. These coordinate transformations can be represented in various ways, e.g. as described in the above Appendix. Coordinate transformations may comprise translations, if the from and to coordinate systems have different origins and may comprise rotations if the from and to Cartesian coordinate systems have different axis directions and may involve transcendental transformations if the from and to coordinate systems are respectively Cartesian and polar or geodetic coordinate systems. Transformations between Cartesian and polar coordinates are known and are described e.g. in Section C.3.1 of Grewal et al, 2007. Regarding rotations, it is appreciated that Euler angles may be used to define or represent vehicle attitude, and this is commonly done in navigation although not for representing vehicle attitude dynamics. Euler angles may be used to define a coordinate transformation as a set of three angular rotations, performed in a specified sequence about three respective orthogonal axes, thereby to cause one coordinate frame to coincide with the other. The coordinate transformation from RPY coordinates to NED coordinates, for example, may include three Euler rotation matrices.

The Grewal et al reference teaches that the term quaternions refers to sets of four e.g. to an algebra in four dimensions discovered by William Rowan Hamilton. Quaternions may be used for representing rotations as points on a sphere in four dimensions and are used as a standard representation of coordinate transforms in use-cases such as strapdown systems. In matrix algebra, the algebra of quaternions may use an isomorphism between 4×1 quaternion vectors q and real 4×4 quaternion matrices Q. Four 4×4 quaternion basis matrices may be defined, of which the first is an identity matrix and 2nd, 3rd and 4th are antisymmetric. Addition of quaternion vectors may be as per addition of conventional vectors and multiplication may apply conventional matrix multiplication rules to the four quaternion basis matrices, whose multiplication table is known and is given e.g. in Mohinder, 2007, in Table C.1. Typically, quaternion multiplication is noncommutative such that multiplication results depend on the order of multiplication. Conjugation of quaternions is another, unary, operation in which, like in conventional complex number conjugation, the real part (first quaternion component) remains unchanged, whereas the other parts change sign. This is typically equivalent to transposition of the associated quaternion matrix.

The Grewal et al reference teaches that rotation vectors may be used as representations for rotations, however the rotation vector representing successive rotations is, problematically, not a simple function of the respective rotation vectors. This problem may be solved using quaternions, where the quaternion representation of the successive rotations is a quaternion product and each successive rotation is implemented by a single quaternion product. The quaternion equivalent of the rotation vector and the vector resulting from the rotation of any three-dimensional vector through angle θ about unit vector u may also be implemented by a quaternion product. The initial value q[0] for the rotation quaternion typically depends upon the initial orientation of the two coordinate systems e.g. whether or not the two coordinate systems are aligned. A conventional quaternion representation for successive rotations may be used to perform coordinate transformations of any vector w0. Typically, the conventional quaternion representation for successive rotations uses the four components of a unit quaternion to maintain the transformation from one coordinate frame to another through a succession of rotations. If computer roundoff undesirably alters the magnitude of the desired unit quaternion, rescaling to a unit quaternion may be performed, e.g. by dividing by the magnitude.

Reference is now made to FIG. 1 which is a simplified block diagram illustration of a real-time antenna polarization correction system constructed and operative in accordance with certain embodiments. The system as shown in FIG. 1 typically includes an airborne system with antennae, which may or may not be phased array antennae, and which communicate with a ground system antenna, or, more typically, plural ground antennae which may or may not be phased array antennae. The ground antennae is or are linearly polarized, whereas the airborne antennae is or are circularly polarized. It is appreciated that given, say, 2 ground antennae, the first but not the second being at the boresight, there will be no communication problem (no distortion) for the first, however, the second antenna will see or experience elliptical polarization (which becomes progressively more elliptical and less circular, the further from the boresight the second antenna is), hence will experience a polarization loss or mismatch larger than −3 decibels. Communication problems are particularly difficult when one antenna is airborne, hence in motion relative to the corresponding ground antenna/e, which may also be in motion. Distortions, hence polarization loss, typically increase with the distance of the angle from the center of the airborne antenna's lobe.

A real time polarization correction method, which may for example be implemented using the system of FIG. 1, is now described in detail, with reference to the components of FIG. 1 which are not intended to be limiting. The method may include all or any subset of the following operations, suitably ordered e.g. as shown:

operation 0. off-line, a polarization behavior table for a circular antenna 60 (transmitting segment) may be saved, typically in the receiving segment memory 130. Typically, the table stores an axial ratio angle (or polarization angle) or axial ratio, e.g. for each of plural azimuth and elevation angles respectively defining plural possible relative locations of airborne and ground segments. The azimuth and elevation angles typically define a direction from which the receiving segment is currently viewing the transmitting segment, typically at each of various relative locations e.g. of the receiving and transmitting segments. The axial ratio angle may comprise the angle Alpha of the dominant elliptic polarization component which is desired e.g. optimal, for a specific relative location (e.g. specific azimuth and elevation angle).

Any suitable method may be used to generate, in advance, data with which to fill the polarization behavior table (or other data structure) in memory 130 of FIG. 1. For example, techniques for determining the antenna radiation pattern may be based on numerical techniques for modeling the antenna. For example, antenna modelling software such as, say, EZNEC or EZNEC+ or WIPL-D, SAVANT, PATCH and APATCH, may be used to model the antenna and the resulting model may be used to simulate/determine polarization behavior for each of various relative locations between tested and reference antennae (e.g. gain, antenna patterns). For example, for each of various azimuth and elevation angles defining a direction from which a receiving segment is viewing a transmitting segment, the antenna model may be used to determine an angle which provides maximum received power.

Alternatively or in addition, the polarization behavior to be pre-stored in memory 130 may be gathered by physical pre-experimentation. For example, a tested e.g. tx antenna and reference antenna (e.g. rx) may be positioned in a radiation chamber. The reference antenna is typically that which is fixedly positioned and connected to measurement equipment that measures its received power, whereas the tested antenna may be positioned on a tiltable pedestal, providing degrees of freedom in one or more axes, that is typically controlled to move the tested antenna systematically, step by step, automatically or manually, e.g. a degree or two or 3 or 5 at a time, relative to the reference antenna. For example, the tested angle might, in the first step, be moved to a position corresponding to azimuth angle 0 degrees and elevation angle 90 degrees. The second step might be azimuth angle 0 degrees and elevation angle 88 degrees, then in the next step the elevation angle might be 86 degrees, and so on, extending to elevation angle 0 degrees, and then to elevation angle −2 degrees, −4 degrees and so forth, till an elevation angle of −90 degrees. The next steps might be the same, but the azimuth angle might be 2. The next steps might be the same but for an azimuth angle of 4 degrees, and so on until an azimuth angle of 180 degrees is reached. It is appreciated that in this example, the size of each step is 2 degrees both for the azimuth angle and for the elevation angle, however this need not be the case, nor must the size of the step for the azimuth angle be necessarily the same size at the step for the elevation angle. For example, the incrementation between steps for the azimuth angle might be 1 or 3 or 5 degrees each time, and the incrementation between steps for the elevation angle might, say, be 10 degrees. For each such step, one should typically automatically or manually record the current azimuth and elevation angles between the antennas.

Then, typically automatically or manually, one should rotate the tested antenna relative to the fixed position of the reference antenna until an optimal criterion is reached e.g. until a maximum received power is read automatically or manually on the measurement equipment or network analyzer.

At this point, typically, automatically or manually, one should record the angle of rotation of the antenna about its own dominant axis, which yields the maximum reading relative to other angles of rotation, as the Axial Ratio Angle. A conventional network analyzer may be employed in the radiation chamber e.g. to indicate the reception power in the reference antenna so that when the tested antenna is rotated, the angle at which the power is highest is identified. This angle is that in which coordination between the antennae's polarizations is optimal, hence communication between the antennae will be optimal.

It is appreciated that all or any subset of operations 1-6 now described, may be performed continuously or periodically or at any suitable interval or only once, in any suitable order e.g. as follows:

Operation 1: The receiving segment (120) receives messages from the transmitting segment. The messages typically include the following information regarding transmitting segment 60: Location (e.g. LAT and/or LON and/or ALT) and/or body angles (e.g. YAW and/or PITCH and/or ROLL). The above information is provided to processor 90 which typically performs all pointing computations (e.g. pointing of ground antenna to aircraft and/or vice versa, pointing of aircraft antenna to ground antenna), and/or to axial ratio correction computation module 100. The source of the above information may for example be the "broadcast aircraft's location & angles" data repository 50 in FIG. 1.

Operation 2: processor 90 typically computes the pointing p1 (Elevation, Azimuth bearing) from the aircraft to the gnd (aka ground or deployed on the ground) segment. Processor 90 also typically computes the pointing p2 (Elevation, Azimuth bearing) from the gnd to the ac segment.

Pointing computation may be conventional, e.g. as described in sections 14.7, 14.8, 14.9, pages 467-472 of the following Gilbert-Strang publication: haps://www.amazon.com/Linear-Algebra-Geodesy-Gilbert-Strang/dp/0961408863.

Operation 3: processor 90 computes the pointing p3 (Elevation, Azimuth bearing) from the ground to the airborne segment, typically based on p2 as computed in operation 2, typically relative to the body angles of the receiving segment. Any suitable pointing computation technology may be used e.g. using Euler angles or quaternions. An Euler angle based method may use a rotation matrix such as that described in section c.4.1, page 477 of the following publication: http://read.pudn.com/downloads165/ebook/756636/global_positioning_systems_inertial_navigation_and_integration.pdf. a quaternion based method is described in section C.4.4, page 497-501, of the same publication.

Operation 4: processor 90 computes the pointing p4 (Elevation, Azimuth bearing) from the airborne segment to the ground, typically relative to the body angles of the transmitting segment. Typically, p4 is computed based on p1 as computed in operation 2.

This may, for example, be done using Euler angles or quaternions as described above. Pointing P4 typically comprises the relative position of receiving segment in the transmitting segment coordinates (AZ, EL).

Operation 5: Retrieve, e.g. from the polarization behavior table in memory 130 of FIG. 1, a polarization behavior or polarization angle or axial ratio data (e.g. axial ratio angle or axial ratio itself), stored for the (Elevation aka el, Azimuth aka az) angle pair of P4, where the polarization angle may comprise the angle between the radiated e-fields of the tx and rx antennae. The axial ratio data or polarization angle typically provides a dominant polarization vector angle specific to the direction from which the receiving segment is currently observing the transmitting segment.

In elliptical polarization, typically one axis dominates the other. Typically, the system herein is configured to dynamically adapt the linear polarization (on the ground e.g.) to coincide with the dominant axis, e.g. at all times.

According to some embodiments, p3 is used for pointing the ground antenna.

According to some embodiments, p4 is fed as input to axial ratio computation unit 100 in FIG. 1.

Operation 6: to determine the polarization which optimizes reception by the phased array antenna aka receiving segment, phased array antenna may be offset by the angle retrieved from memory 130, in operation 5

An offsetting command may be sent to the receiving segment antenna accordingly e.g. by antenna polarization control unit 110 of FIG. 1. Alternatively or in addition, the final polarization may be fed as an input to the antenna. e.g. via antenna polarization control unit 110 of FIG. 1.

Figure 3:
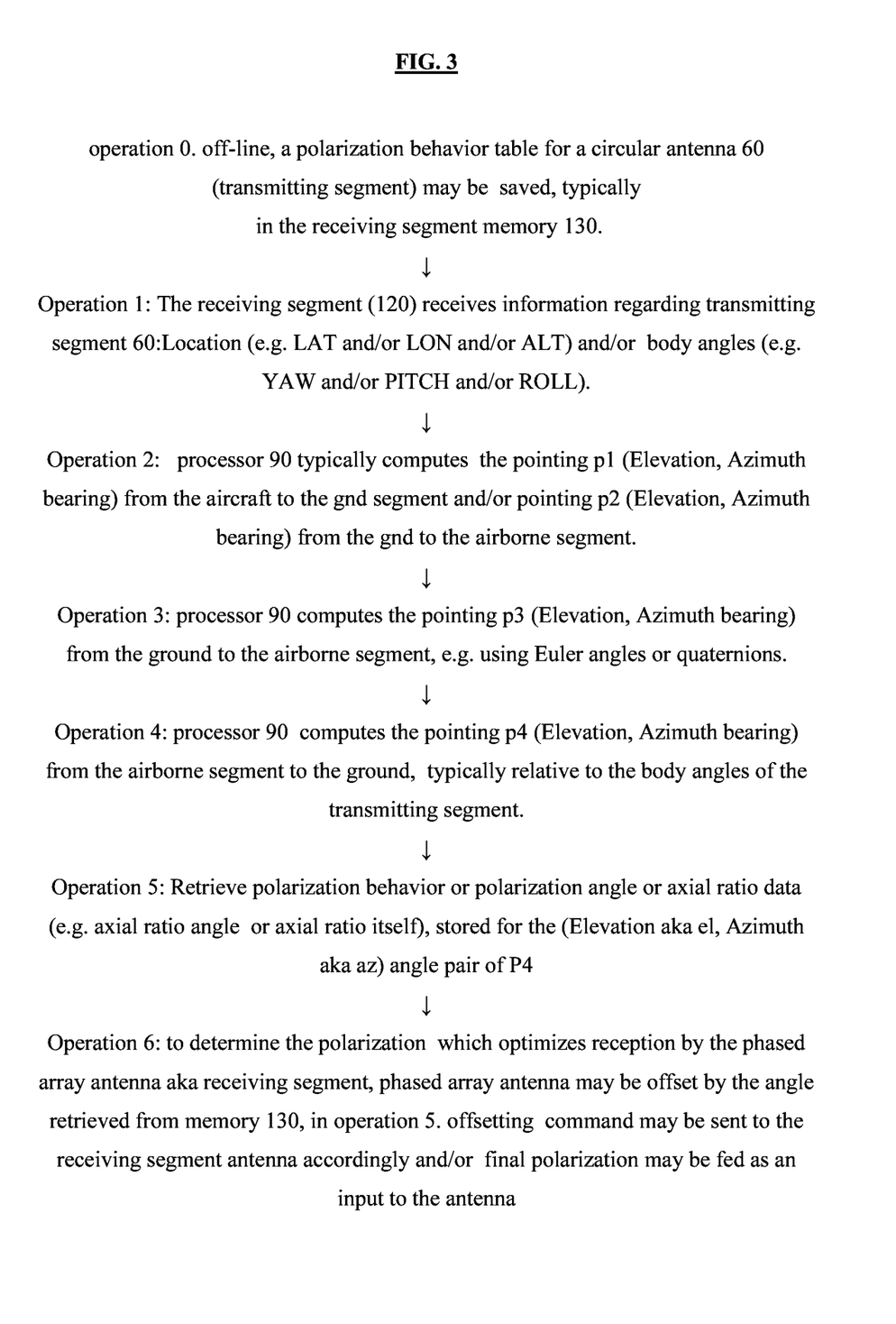
FIG. 3 shows a simplified flow diagram of a method including all or any subset of operations 0-7, suitably ordered e.g. as shown, which may be used e.g. in conjunction with the system of FIG. 1 (or FIG. 4, mutatis mutandis) and/or to implement the method of FIG. 2.

Operations 0-7 are illustrated in the simplified flow diagram of FIG. 3.

Figure 4:
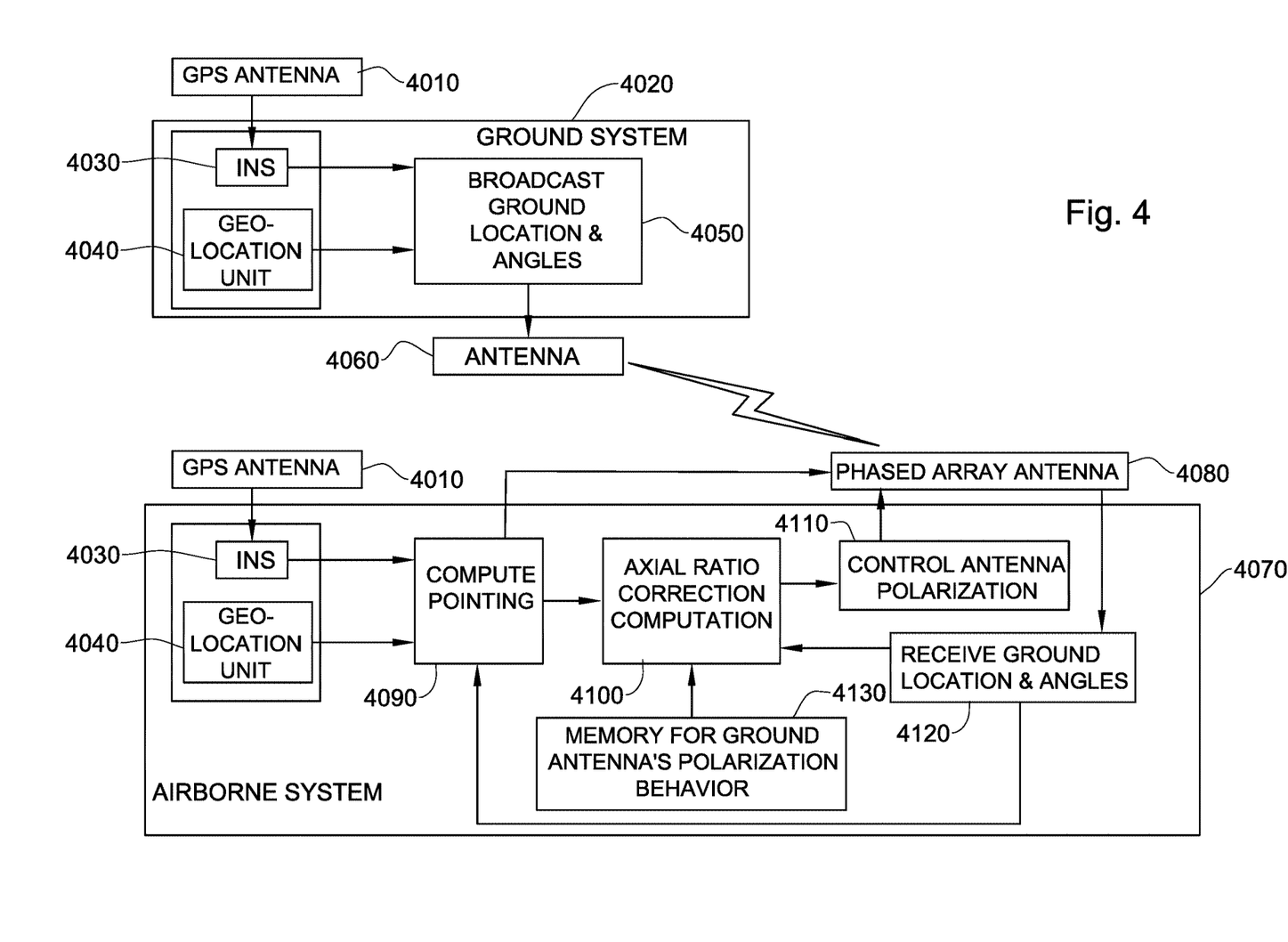
FIG. 4 is a simplified block diagram illustration of a real-time antenna polarization correction system constructed and operative in accordance with another embodiment of the present invention.

Referring now to FIG. 4, this is a modification of the embodiment of FIG. 1. In FIG. 1, the airborne is (say) circularly polarized, whereas the ground antenna is that being controlled as per the teachings herein e.g. A phased array antenna, and computations are on the ground. However, this need not be the case. The real-time correction computations may for example be performed in the airborne segment or more generally need not necessarily be performed in the same segment as is being controlled (in the same segment that comprises the phased array antenna e.g. (In FIG. 4, the ground antenna may be circularly polarized, and the airborne antenna may comprise a phased array antenna.

More generally, it is appreciated that the system shown and described herein (which at some points is described in terms of a ground phased array antenna and an airborne circularly polarized antenna and polarization behavior stored on the ground) need not necessarily include a ground phased array antenna and an airborne circularly polarized antenna nor must the correction computations necessarily occur on the ground or in the segment (ground or airborne) associated with, or co-located with, the phased array antenna which is either on the ground or airborne. Instead, the ground antenna may for example comprise a circularly polarized antenna and the airborne antenna may comprise a phased array antenna. Alternatively or in addition, the real-time correction computations described herein may partly or entirely take place in the airborne segment, which may then command the ground segment accordingly (e.g. If the phased array antenna is on the ground). Or, correction computations may partly or entirely take place in the ground segment, which may then command the airborne segment accordingly (e.g. If the phased array antenna is airborne). Similarly, polarization behavior may be stored in the airborne or ground segments and may be communicated respectively to whichever segment, ground or airborne, is performing real-time correction computations that factor in the polarization behavior, as described herein.

According to certain embodiments, some or all real-time computations occur in the airborne platform (which has assembled data indicating locations of the ground units) and, as a result thereof, commands go down to the ground to execute a correction of such and such number of degrees in such and such a direction.

The embodiments shown and described herein, including all or any subset of their elements, may be employed to advantage for any of the following, separately or in any combination:
improving functioning of any communication system which uses antennae to transmit and receive
adding gain to the link budget between the ground and aircraft
increasing the receiving sensitivity of the ground antennae
increasing the operational range of the system
decrease the maneuverings of an airborne system
providing flexibility of the ground segments location.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. An antenna system operative in conjunction with an airborne transmitting segment and moving ground receiving segments having polarization therebetween, the polarization having an axial ratio, the antenna system comprising:

at least one processor in respective data communication with at least one receiving segment in motion on the ground including an antenna; and computer memory which is accessible to said at least one processor and which stores a computer representation indicative of at least one desirable polarization behavior parameter of the airborne transmitting segment, for each of multiple relative locations of the airborne and ground segments, the at least one processor being configured to provide a current relative location of the airborne transmitting segment and receiving segment/s on the ground, to access an desirable polarization behavior parameter associated with the current relative location of the airborne segment and receiving segment/s on the ground from said computer representation, to access a current polarization behavior parameter of at least one of said receiving segment/s' antenna, to compute a real time adjustment of the polarization's axial ratio which, if applied to the receiving segment antenna, will change the receiving segment antenna's polarization behavior parameter from said current polarization behavior parameter to said stored polarization behavior parameter, and to feed said real time adjustment to said receiving segment antenna.

2. The antenna system according to claim 1 wherein the airborne transmitting segment comprises a circularly polarized antenna.

3. The antenna system according to claim 1 wherein at least one of the moving ground receiving segments comprises a phased array antenna.

4. The antenna system according to claim 1 wherein said desirable polarization behavior parameter comprise a polarization angle A which improves reception, relative to at least one polarization angle other than said polarization angle A, between said airborne transmitting segment and moving ground receiving segment, given the current relative location of the airborne segment and segment on the ground.

5. The antenna system according to claim 1 wherein said relative locations of the airborne and ground segments are represented in memory by azimuth and elevation angles defining a direction from which the receiving segment is currently viewing the transmitting segment.

6. The antenna system according to claim 1 wherein the airborne transmitting segment comprises a phased array antenna.

7. The antenna system according to claim 1 wherein at least one of the moving ground receiving segments comprises a circularly polarized antenna.

8. The antenna system according to claim 1 wherein said at least one processor in respective data communication with at least one receiving segment in motion comprises plural processors in respective data communication with plural receiving segments in motion, respectively.

9. The antenna system according to claim 1 wherein said at least one processor is co-located with said receiving segment in motion.

10. The antenna system according to claim 1 wherein said desirable polarization behavior parameter comprises a polarization angle A which improves reception, relative to most polarization angles other than said polarization angle A, between said airborne transmitting segment and moving ground receiving segment, given the current relative location of the airborne segment and segment on the ground.

11. The antenna system according to claim 1 wherein said desirable polarization behavior parameter comprises a polarization angle A which improves reception, relative to all polarization angles other than said polarization angle A, between said airborne transmitting segment and moving ground receiving segment, given the current relative location of the airborne segment and segment on the ground.

12. The antenna system according to claim 1 wherein said computer representation indicative of at least one desirable polarization behavior parameter comprises at least one of:
the parameter itself;
data from which said at least one desirable polarization behavior parameter is derivable; or
data from which said at least one desirable polarization behavior parameter can be estimated.

13. A method for controlling an antenna system operative in conjunction with an airborne transmitting segment and moving ground receiving segments having polarization therebetween, the polarization having an axial ratio, the method comprising:
providing at least one processor in respective data communication with at least one receiving segment in motion on the ground including an antenna; and
providing computer memory which is accessible to said processor and which stores a computer representation indicative of at least one desirable polarization behavior parameter of the airborne transmitting segment, for each of multiple relative locations of the airborne and ground segments,
the processor being operative:
to provide a current relative location of the airborne transmitting segment and receiving segment/s on the ground,
to access an desirable polarization behavior parameter associated with the current relative location of the airborne segment and receiving segment/s on the ground from said computer representation,
to access a current polarization behavior parameter of at least one of said receiving segment/s' antenna,
to compute a real time adjustment of the polarization's axial ratio which, if applied to the receiving segment antenna, will change the receiving segment antenna's polarization behavior parameter from said current polarization behavior parameter to said stored polarization behavior parameter, and
to feed said real time adjustment to said at least one receiving segment antenna.

14. A computer program product, comprising:
a non-transitory tangible computer readable medium having computer readable program code embodied therein, said computer readable program code adapted to be executed to implement a method for controlling an antenna system operative in conjunction with an airborne transmitting segment and moving ground receiving segments having polarization therebetween, the polarization having an axial ratio, the method comprising:
providing at least one processor in respective data communication with at least one receiving segment in motion on the ground including an antenna; and
providing computer memory which is accessible to said at least one processor and which stores a computer representation indicative of at least one desirable polarization behavior parameter of the airborne transmitting segment, for each of multiple relative locations of the airborne and ground segments,
the at least one processor being operative:
to provide a current relative location of the airborne transmitting segment and receiving segment/s on the ground,
to access an desirable polarization behavior parameter associated with the current relative location of the airborne segment and receiving segment/s on the ground from said computer representation,
to access a current polarization behavior parameter of at least one of said receiving segment/s' antenna,
to compute a real time adjustment of the polarization's axial ratio which, if applied to the receiving segment antenna, will change the receiving segment antenna's polarization behavior parameter from said current polarization behavior parameter to said stored polarization behavior parameter, and
to feed said real time adjustment to said at least one receiving segment antenna.

\* \* \* \* \*